United States Patent
Parker et al.

(10) Patent No.: US 7,088,562 B2
(45) Date of Patent: Aug. 8, 2006

(54) ELECTRICAL LEAD STRUCTURES HAVING CRYSTALLINE STRUCTURES THAT MATCH UNDERLYING MAGNETIC HARD BIAS LAYERS FOR MAGNETORESISTIVE SENSORS

(75) Inventors: Michael Andrew Parker, Fremont, CA (US); Mustafa Michael Pinarbasi, Morgan Hill, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 250 days.

(21) Appl. No.: 10/631,338

(22) Filed: Jul. 30, 2003

(65) Prior Publication Data

US 2005/0024795 A1    Feb. 3, 2005

(51) Int. Cl.
*G11B 5/39*    (2006.01)

(52) U.S. Cl. .................. 360/324.12; 360/322

(58) Field of Classification Search ............ 360/322, 360/324.12, 324.1, 324, 313, 110
See application file for complete search history.

(56) References Cited

U.S. PATENT DOCUMENTS

| | | | |
|---|---|---|---|
| 4,639,806 A * | 1/1987 | Kira et al. ............. | 360/327.32 |
| 5,993,956 A | 11/1999 | Lambeth et al. ............ | 428/332 |
| 6,077,603 A | 6/2000 | Zhang ..................... | 428/332 |
| 6,185,081 B1 | 2/2001 | Simion et al. ........... | 360/327.3 |
| 6,219,207 B1 | 4/2001 | Pinarbasi .................. | 360/322 |
| 6,417,999 B1 | 7/2002 | Knapp et al. ............... | 360/322 |
| 6,632,474 B1 * | 10/2003 | Horng et al. ............... | 427/131 |
| 2001/0033949 A1 | 10/2001 | Abarra et al. ............... | 428/694 |

OTHER PUBLICATIONS

Muller, Stefan. "Bulk and Surface Ordering Phenomena in Binary Metal Alloys". J. Phys. Condens. Matter v. 15 (2003) pp. 1429-1430 and 1478.*

Schirmer, B. "Exploring the limits of functional modification of thin magnetic films", Forschungszentrum Julich (Hannover, Germany: TIB Hannover) Mar. 1999.*

* cited by examiner

*Primary Examiner*—Julie Anne Watko
(74) *Attorney, Agent, or Firm*—Intellectual Propety Law Offices; Robert O. Guillot, Esq.

(57) ABSTRACT

A magnetic head including an electrical lead layer that is comprised of a material having an ordered crystalline structure. In a preferred embodiment, the ordered crystalline structure of the electrical lead is epitaxially matched to the crystalline structure of the hard bias layer upon which it is formed, and there is no need for a seed layer for the electrical leads. Electrical leads having an ordered crystalline structure, particularly a B2, $L1_0$, $L1_1$, $L1_2$ and $D0_3$ structure, will have significantly reduced resistivity over the prior art electrical leads that are typically composed of rhodium or tantalum. As a result, thinner electrical leads can be fabricated which carry the same, or even greater, current than the prior art rhodium or tantalum leads. The preferred leads are comprised of NiAl having a B2 crystalline structure, and alternative embodiments are comprised of CuAu, $Cu_3Au$, $Ni_3Al$ and $Fe_3Al$.

20 Claims, 2 Drawing Sheets

ELECTRICAL LEAD STRUCTURES HAVING CRYSTALLINE STRUCTURES THAT MATCH UNDERLYING MAGNETIC HARD BIAS LAYERS FOR MAGNETORESISTIVE SENSORS

BACKGROUND OF THE INVENTION

1. Field of the Invention

The present invention relates generally to magnetoresistive (MR and GMR) sensors for read head portions of magnetic heads for hard disk drives, and more particularly to electrical leads for conducting current to such MR and GMR sensors.

2. Description of the Prior Art

In commonly used magnetoresistive (MR) and giant magnetoresistive (GMR) read head sensors an underlayer is deposited upon a wafer substrate and a first magnetic shield (S1) is fabricated upon the underlayer. A first insulation layer (G1) is then fabricated upon the S1 shield. A sensor structure is fabricated upon the G1 layer and located in a central read region of the head, while hard bias elements and electrical contact leads are fabricated and located in each of two side regions. The central sensor structure typically includes an antiferromagnetic pinning layer, ferromagnetic pinned layers, a nonmagnetic spacer layer, a ferromagnetic free layer, and a nonmagnetic cap layer. The hard bias element typically includes a seed layer and a magnetic hard bias layer. The electrical contact leads typically include a seed layer and an electrically conducting nonmagnetic lead layer. A second insulation layer (G2) followed by a second magnetic shield layer (S2) are subsequently fabricated.

A problem that has been recognized with regard to such prior art MR and GMR read heads is that the electrical leads must be thick enough to supply an adequate electrical current flow through the sensor; however, such thick electrical leads can create a rather severe step that must be covered by sufficient G2 insulation to prevent electrical shorting between the leads and the second magnetic shield S2 that is fabricated above the G2 insulation layer. It is therefore desirable to fabricate the sensor with thinner electrical leads which reduce the size of the step to avoid electrical shorting and which nevertheless conduct sufficient current to the sensor.

SUMMARY OF THE INVENTION

The present invention is an improved magnetic head for a hard disk drive including an electrical lead layer that is comprised of a material having an ordered crystalline structure. In a preferred embodiment, the ordered crystalline structure of the electrical lead is epitaxially matched to the crystalline structure of the hard bias layer upon which it is formed. In this embodiment there is no need for a seed layer for the electrical leads.

Electrical leads having an ordered crystalline structure, particularly a B2, $L1_0$, $L1_1$, $L1_2$ and $D0_3$ structure, will have significantly reduced resistivity over the prior art electrical leads that are typically composed of rhodium or tantalum. As a result, thinner electrical leads can be fabricated which carry the same, or even greater, current than the prior art rhodium or tantalum leads. The thinner electrical leads result in a reduced electrical lead step height, and thereby have reduced occurrence of electrical shorts in the manufactured magnetic heads, ultimately leading to improved yield of the manufacturing process.

The preferred leads of the present invention are comprised of NiAl having a B2 crystalline structure, and alternative embodiments include electrical leads that are comprised of CuAu, $Cu_3Au$, $Ni_3Al$ and $Fe_3Al$.

It is an advantage of the magnetic heads of the present invention that it includes a thinner electrical lead.

It is another advantage of the magnetic head of the present invention that it includes an electrical lead having reduced resistivity.

It is a further advantage of the magnetic head of the present invention that it includes an electrical lead having crystalline structure that is epitaxially matched to the crystalline structure of the hard bias layer upon which it is fabricated.

It is yet another advantage of the magnetic head of the present invention that the electrical leads can be fabricated without need of an electrical lead seed layer.

It is an advantage of the hard disk drive of the present invention that it includes a magnetic head of the present invention having a thinner electrical lead.

It is an advantage of the hard disk drive of the present invention that it includes an electrical lead having reduced resistivity.

It is an advantage of the hard disk drive of the present invention that it includes an electrical lead having crystalline structure that is epitaxially matched to the crystalline structure of the hard bias layer upon which it is fabricated.

It is an advantage of the method for fabricating a magnetic head of the present invention that it is fabricated utilizing electrical leads having a reduced thickness.

It is another advantage of the method for fabricating a magnetic head of the present invention that the fabrication of electrical leads do not require the deposition of a seed layer.

It is a further advantage of the method for fabricating a magnetic head of the present invention that it is fabricated with thinner electrical leads which reduce the incidence of electrical shorts, thereby increasing the yield of the fabrication process.

These and other features and advantages of the present invention will no doubt become apparent to those skilled in the art upon reading the following detailed description with makes reference to the several figures of the drawings.

IN THE DRAWINGS

DETAILED DESCRIPTION OF THE PREFERRED EMBODIMENTS

Figure 1:
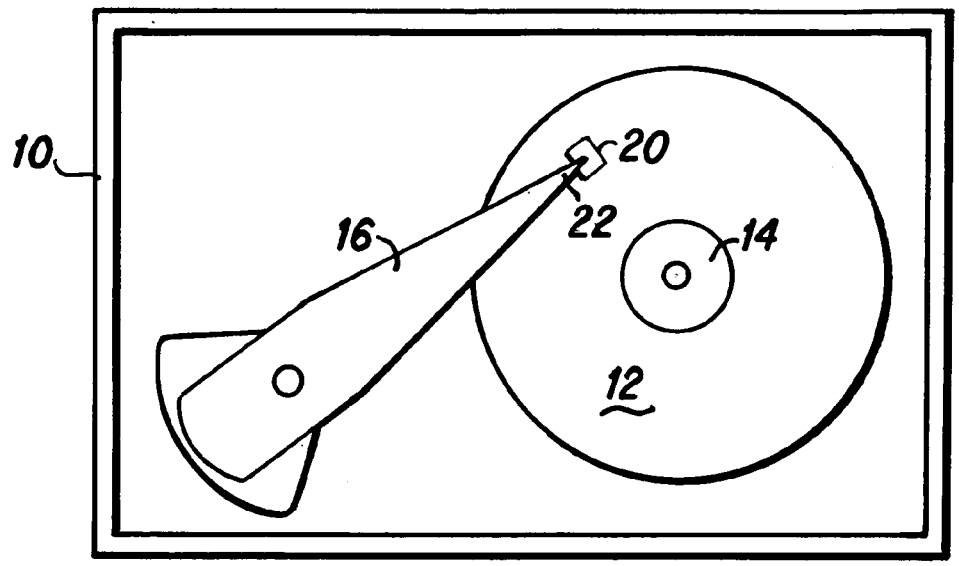
FIG. 1 is a top plan view depicting a hard disk drive having a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16, each having a magnetic head 20 mounted upon the distal end 22 of the actuator arm. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

Figure 2:
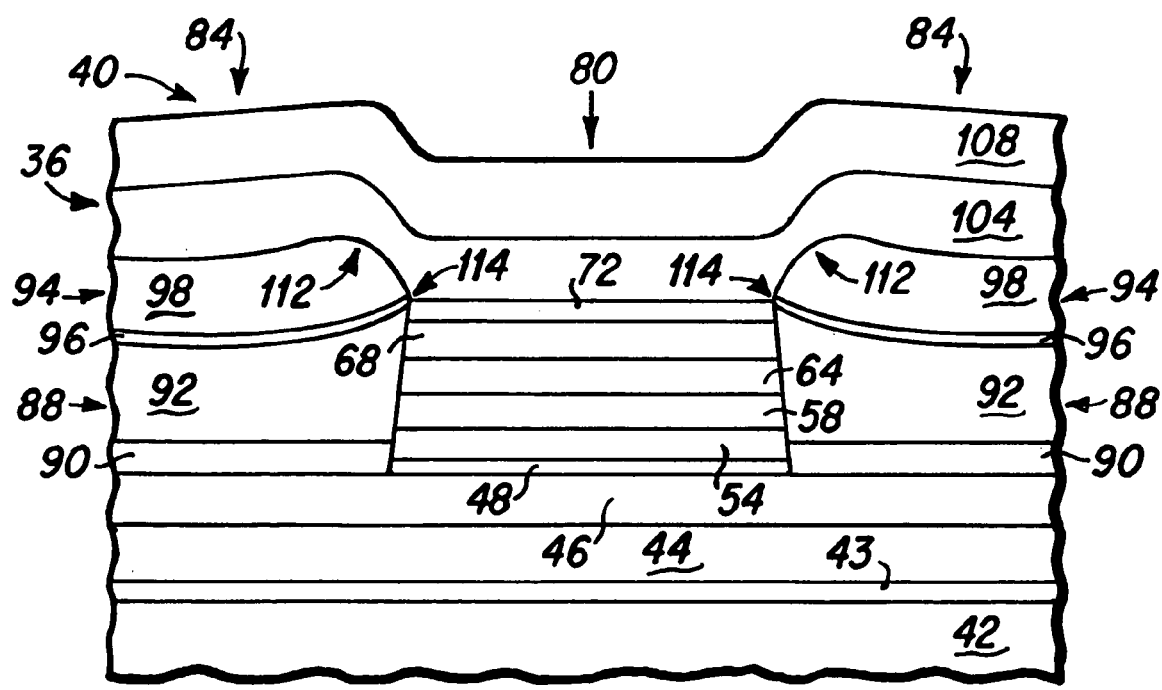
FIG. 2 is a side cross-sectional view of a prior art read head portion of a magnetic head.

FIG. 2 is a side cross-sectional view of a prior art giant magnetoresistive (GMR) read element 36 of a prior art magnetic head 40. As depicted therein, the prior art GMR read element 36 generally includes a substrate base 42 that constitutes the material upon which the magnetic head is fabricated, such as alumina/titanium carbide. An alumina underlayer 43 is deposited upon the substrate and a first magnetic shield S1 44 is fabricated on the underlayer 43. An insulation layer G1 46, typically composed of aluminum oxide, is then fabricated upon the S1 magnetic shield 44. A seed layer 48 is deposited upon the G1 insulation layer 46 and a series of thin film layers are sequentially deposited upon the seed layer 48 to form the GMR read head sensor. A variety of thin film layers are known in the prior art to fabricate such GMR sensors, and, for the purposes of the present invention the layers generally include an antiferromagnetic layer 54, a pinned magnetic layer 58 that is deposited upon the antiferromagnetic layer 54, a spacer layer 64 that is deposited upon the pinned magnetic layer 58, a free magnetic layer 68 that is deposited upon the spacer layer 54 and a cap layer 72 that is deposited upon the free magnetic layer 68. Typically, the antiferromagnetic layer 54 may be composed of PtMn, the pinned magnetic layer 58 may be composed of CoFe, the spacer layer 64 may be composed of Cu, the free magnetic layer 68 may be composed of NiFe and the cap layer 72 may be composed of Ta.

Following the deposition of the GMR sensor layers 54–72, a patterned etching or ion milling process is conducted in which a mask is fabricated over the central regions 80 of the layers 54–72 and the unmasked side regions 84 are exposed and removed, such that only central regions 80 of the layers 54–72 remain. Thereafter, hard bias elements 88 are deposited on each side of the central regions 80, including the deposition of a seed layer 90 and a hard bias layer 92 that is typically composed of a cobalt alloy material such as CoPtCr. Following the deposition of the hard bias elements 88, electrical contacts 94 are fabricated on top of the hard bias elements 88. The electrical contacts include a seed layer 96 that is deposited upon the hard bias layer 92 and electrical leads 98 that are fabricated upon the seed layer 96. The electrical leads 98 are typically composed of rhodium or tantalum. A second insulation layer G2 104 is then fabricated on top of the electrical leads 98 followed by the fabrication of a second magnetic shield layer S2 108 and further components that are well known to those skilled in the art for fabricating a complete magnetic head.

The GMR sensor has a read gap that is defined by the distance between the two magnetic shields 44 and 108 in which the sensor detects passing magnetic bits of the hard disk 12 of the disk drive 10. When the GMR sensor is more sensitive, the read gap can be reduced in size and the read element can read smaller data bits that are formed on the hard disk 12, such that the areal data storage density (bits per inch) of the hard disk can be increased. However, one of the significant factors in controlling the size of the read gap is the thickness of the G2 insulation layer 104. Particularly, a problem that exists with the prior art GMR sensor depicted in FIG. 2 is that the thickness of the electrical leads 98 creates a significant step 112 where the electrical lead 98 converges with the side edge 114 of the central portion of the sensor. Where such a step 112 exists, a thick G2 insulation layer must be deposited in order to be assured of insulation coverage at the step in order to prevent electrical shorting at the step location between the electrical lead 98 and the S2 magnetic shield 108. Such electrical shorting will render the GMR sensor inoperable. As is next described, the GMR sensor of the magnetic head of the present invention is fabricated with thinner electrical leads that result in a reduction in the step 112, resulting in improved performance characteristics of the magnetic head and hard disk drive.

Figure 3:
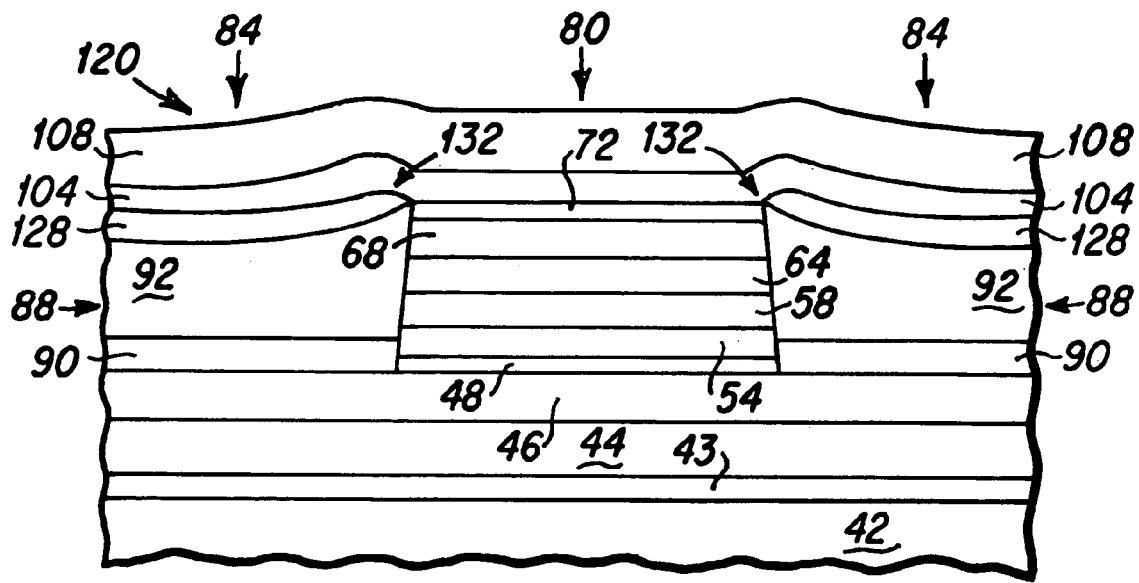
FIG. 3 is a side cross-sectional view of a first preferred embodiment of a read head portion of a magnetic head of the present invention.

The improved GMR sensor of the magnetic head of the present invention 120 is depicted in FIG. 3, wherein identical components to the prior art GMR sensor depicted in FIG. 2 are similarly numbered for ease of comprehension. As depicted in FIG. 3, the GMR sensor of the magnetic head 120 of the present invention includes a substrate base 42, an alumina underlayer 43, a first magnetic shield 44, an insulation layer 46, a seed layer 48, and GMR sensor layers that may generally include an antiferromagnetic layer 54, a pinned magnetic layer 58, a spacer layer 64, a free magnetic layer 68 and a cap layer 72. Hard bias elements 88 are fabricated on the sides of the centrally located GMR sensor layers, and they include a seed layer 90 and a hard bias layer 92 that is composed of a cobalt alloy, such as CoPtCr.

In contrast to the prior art sensor structure, the sensor of the magnetic head of the present invention is fabricated with electrical leads 128 having a different composition; particularly they that are composed of a material having an ordered crystalline structure. An ordered crystalline structure means that specific atoms reside at specific locations within the crystal structure. This is to be contrasted with an unordered crystalline structure in which nonspecific or random atoms of an alloy reside randomly at the various locations within a crystal structure. Advantageously, as compared to the prior art electrical leads 98 that are composed of rhodium or tantalum, the electrical leads 128 of the present invention, being composed of a material with an ordered crystalline structure, have a lower resistivity. As a result, a thinner electrical lead 128 can be fabricated, which carries the same electrical current as the thicker prior art leads 98. The thinner electrical leads 128 of the present invention result in a reduced step size 132, thereby enabling the use of a thinner G2 insulation layer 104, because the problem of electrical shorting to the S2 magnetic shield 108 is significantly reduced. As a result, an improved magnetic head 120 is created in which the read gap is reduced because the thickness of the G2 insulation layer 104 has been reduced. Further details and particular embodiments of the present invention are next discussed.

Figure 4:
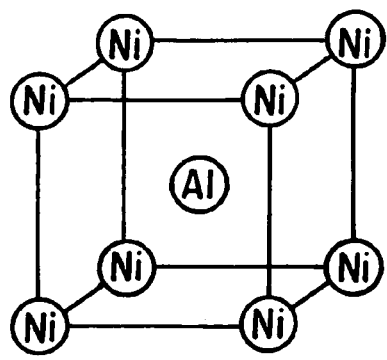
FIG. 4 depicts the B2 ordered crystalline structure of NiAl.
Figure 5:
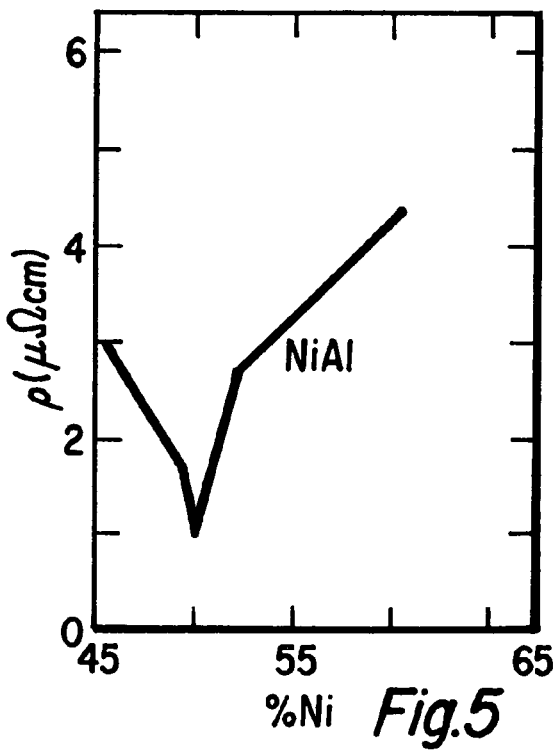
FIG. 5 is a graph depicting the change in resistivity of NiAl with the percentage nickel composition.

In a first embodiment of the magnetic head 120 of the present invention the electrical leads are comprised of β-NiAl having a B2 crystal structure, and such a crystal structure is depicted in FIG. 4. As is seen in FIG. 4, the β-NiAl structure is an ordered crystalline structure of the body centered cubic type, in which nickel atoms are located at the cubic corners and aluminum atoms are centrally disposed within the nickel cubic lattice. The relative compositions of Ni and Al in the NiAl lead are important in achieving the B2 ordered crystalline structure, and FIG. 5 is a graph of the resistivity of NiAl compositions at room temperature. It has been generally observed that ordered intermetallic alloys have a lower resistivity than solid solutions consisting of alloys of the same composition, and as can be seen in FIG. 5, the resistivity of NiAl compositions varies with the percentages of Ni and Al. Specifically, a preferred NiAl electrical lead structure 120 of the present invention will desirably have a low resistivity, and it is seen that where the percent Ni is from approximately 45% to approximately 60%, the resistivity is reduced as the B2 ordered crystalline structure is formed in this range. Where the Ni concentration is preferably approximately 50% the lowest resistivity is achieved, which is approximately 1.0 μΩcm at 50% Ni.

In comparing the NiAl electrical lead of the present invention (assuming 50% Ni) with the rhodium leads of the prior art, the improvement of the present invention can be quantified in that the prior art rhodium leads have a bulk resistivity of approximately 4.3 μΩcm where the NiAl leads of the present invention have a bulk resistivity of approximately 1 μΩcm. As a result, the NiAl electrical leads of the present invention can be fabricated with approximately ¼ of the thickness of the prior art rhodium leads and still conduct the same quantity of electrical current through the sensor. Particularly, where the prior art rhodium leads are typically fabricated with a thickness of approximately 25 nm, the NiAl electrical leads of the magnetic head 120, can be fabricated with a thickness of approximately 6–7 nm. Of course, the thickness of the NiAl leads can be varied, such as by using a 15 nm thick NiAl lead layer which will have improved electrical current carrying capabilities over the prior art magnetic head, thereby increasing sensor signal values, while the electrical lead is still significantly thinner than the prior art 25 nm rhodium electrical lead.

An additional feature that results from the fabrication of NiAl leads 128 above a cobalt alloy hard bias layer 92 (such as CoPtCr) is that the cobalt alloy hard bias layer is also formed with an ordered crystalline structure, and the NiAl leads are closely epitaxially matched with the ordered crystalline structure of such cobalt alloys. As a result, where the NiAl leads 128 are fabricated above such cobalt alloy hard bias layers 92, there is no need to deposit a seed layer (such as prior art seed layer 96). Rather, the epitaxial matching of the cobalt alloy structure with the NiAl structure leads to the formation of the NiAl structure having a B2 structure with a large, ordered grain size. It is therefore desirable that the hard bias layer be composed of a cobalt alloy, such as CoPtCr, with a composition selected to epitaxially match the lattice parameter of NiAl having an ordered B2 structure, and a preferred hard bias layer composition is $Co_{82}Pt_{10}Cr_8$. Thus the epitaxially matched hard bias/lead layer structure contributes to the low resistivity of the electrical leads, further reduces the size of the step 132 as no electrical lead seed layer is required, and improves the performance of the magnetic head.

With regard to the fabrication of the NiAl leads, it is preferred that they be deposited by ion beam deposition utilizing $Ni_XAl_{1-X}$ targets having a composition where X is between 0.46 and 0.50. Where the NiAl leads are deposited using ion beam deposition they have a larger grain size and an improved ordered crystalline structure, resulting in lower resistivity. Another benefit of the fabrication of the magnetic heads using NiAl leads is that the use of NiAl leads will result in substantial cost savings due to the use of the NiAl alloy target, which is considerably less expensive than the currently used prior art rhodium material targets. Additionally, the present invention has secondary cost benefits beyond those associated with the cost of targets alone, through the reduction of process deposition steps required for the prior art electrical lead seed layer 96, and the improved yields associated with fewer electrical shorts between the S2 shield and the electrical lead 128 due to the reduction in the size of the electrical lead step 132.

While a preferred embodiment of the present invention includes the NiAl lead layer having a B2 ordered crystalline structure, the electrical leads of alternative embodiments of the present invention can be fabricated with other particular ordered crystalline structures of other alloy compositions. Specifically, reduced resistivity of ordered crystalline structures can be found in ordered structures selected from the group consisting of $L1_0$, $L1_1$, $L1_2$ and $D0_3$. Particular alloy compositions of these ordered crystal structures are CuAu having an $L1_0$ structure, $Cu_3Au$ having an $L1_2$ structure, and $Fe_3Al$ or $Ni_3Al$ having a $D0_3$ ordered structure. These further compositions in their ordered crystalline structures will possess reduced resistivity as compared to nonordered compositions such as rhodium and tantalum of the prior art. The ordered crystalline structure of these materials is more difficult to attain, and the use of slow deposition rates and thermal annealing in the formation of the lead structures utilizing these materials will aid in the creation of the desired ordered crystalline structure of these lead materials.

It is therefore to be understood that a significant feature of the present invention is the fabrication of the electrical leads from a bimetal alloy having an ordered crystalline structure that has a low resistivity. Nickel aluminum is a desirable choice because it has a B2 structure having a resistivity of approximately 1 μΩcm in bulk. Due to its low resistivity, the thickness of the NiAl lead layer can be substantially reduced over the prior art thickness and adequate electrical current will still flow through the sensor layers. Additionally, the B2 structure of NiAl is epitaxially matched to the cobalt alloy (such as CoPtCr) of the hard bias layer, and there is no need for a seed layer which advantageously further reduces the thickness of the hard bias/lead structure. As a result, the size of the electrical lead step 132 over the prior art step 112 is reduced, leading to a reduction in the thickness of the G2 insulation layer and a corresponding reduction in the read gap of the magnetic head of the present invention. β-NiAl with the B2 structure is inexpensive, has high hardness, excellent corrosion resistance, low resistivity, and requires no high temperature annealing step.

Thus, the present invention is intended to apply to various types and configurations of GMR read heads that may include various numbers and types of thin film layers to provide improved read head characteristics. Therefore, while the present invention has been shown and described with regard to certain preferred embodiments, it will be understood that those skilled in the art will no doubt develop certain alterations and modifications thereto which nevertheless include the true spirit and scope of the invention. It is therefore intended that the following claims cover all such alterations and modifications.

We claim:

1. A magnetic head having a magnetoresistive sensor, comprising:
    a plurality of sensor layers;
    a hard bias/lead structure being disposed at side areas of said sensor layers, said hard bias/lead structure including: a hard bias layer having a crystalline structure and electrical lead layer having an ordered crystalline structure, and wherein said crystalline structure of said lead is epitaxially matched to said crystalline structure of said hard bias layer, and wherein said hard bias layer is composed of a cobalt alloy, and wherein said lead layer is formed with a B2 structure.

2. A magnetic head as described in claim 1 wherein said lead layer is composed of NiAl.

3. A magnetic head as described in claim 1 wherein said lead layer is comprised of NiAl, wherein the Ni composition ranges from approximately 45% to approximately 60%.

4. A magnetic head as described in claim 3 wherein said Ni composition is approximately 50%.

5. A magnetic head having a magnetoresistive sensor, comprising:
   a plurality of sensor layers;
   a hard bias/lead structure being disposed at side areas of said sensor layers, said hard bias/lead structure including an electrical lead layer having an ordered crystalline structure; and wherein said electrical lead layer ordered crystalline structure is selected from the group consisting of B2, $L1_0$, $L1_1$, $L1_2$ and $D0_3$.

6. A magnetic head having a magnetoresistive sensor, comprising:
   a plurality of sensor layers;
   a hard bias/lead structure being disposed at side areas of said sensor layers, said hard bias/lead structure including an electrical lead layer having an ordered crystalline structure; and wherein said electrical lead layer is comprised of a material selected from the group consisting of NiAl, CuAu, $Cu_3Au$, $Ni_3Al$ and $Fe_3Al$.

7. A magnetic head having a magnetoresistive sensor, comprising:
   a plurality of sensor layers;
   a hard bias/lead structure being disposed at side areas of said sensor layers, said hard bias/lead structure including a hard bias layer that is comprised of a cobalt alloy, and an electrical lead layer that is comprised of an NiAl alloy and is deposited directly upon said hard bias layer.

8. A magnetic head as described in claim 7 wherein said NiAl electrical lead has a B2 crystalline structures.

9. A magnetic head as described in claim 7 wherein said NiAl lead layer includes Ni having a composition between 45% Ni and 60% Ni.

10. A magnetic head as described in claim 9 wherein said Ni composition is approximately 50%.

11. A hard disk drive including a magnetic head having a magnetoresistive sensor, comprising:
    a plurality of sensor layers;
    a hard bias/lead structure being disposed at side areas of said sensor layers, said hard bias/lead structure including:
    a hard bias layer having a crystalline structure and electrical lead layer having an ordered crystalline structure, and wherein said crystalline structure of said lead is epitaxially matched to said crystalline structure of said hard bias layer; and wherein said hard bias layer is composed of a cobalt alloy, and wherein said lead layer is formed with a B2 structure.

12. A hard disk drive as described in claim 11 wherein said lead layer is composed of NiAl.

13. A hard disk drive as described in claim 11 wherein said lead layer is comprised of NiAl, wherein the Ni composition ranges from approximately 45% to approximately 60%.

14. A hard disk drive as described in claim 13 wherein said Ni composition is approximately 50%.

15. A hard disk drive including a magnetic head having a magnetoresistive sensor, comprising:
    a plurality of sensor layers;
    a hard bias/lead structure being disposed at side areas of said sensor layers, said hard bias/lead structure including an electrical lead layer having an ordered crystalline structure; and wherein said ordered crystalline structure is selected from the group consisting of B2, $L1_0$, $L1_1$, $L1_2$ and $D0_3$.

16. A hard disk drive including a magnetic head having a magnetoresistive sensor, comprising:
    a plurality of sensor layers;
    a hard bias/lead structure being disposed at side areas of said sensor layers, said hard bias/lead structure including an electrical lead layer having an ordered crystalline structure; and wherein said electrical lead is comprised of a material selected from the group consisting of NiAl, CuAu, $Cu_3Au$, $Ni_3Al$ and $Fe_3Al$.

17. A hard disk drive including a magnetic head having a magnetoresistive sensor, comprising:
    a plurality of sensor layers;
    a hard bias/lead structure being disposed at side areas of said sensor layers, said hard bias/lead structure including a hard bias layer that is comprised of a cobalt alloy, and an electrical lead layer that is comprised of an NiAl alloy and is deposited directly upon said hard bias layer.

18. A hard disk drive as described in claim 17 wherein said NiAl electrical lead has a B2 crystalline structure.

19. A hard disk drive as described in claim 17 wherein said NiAl lead layer includes Ni having a composition between 45% Ni and 60% Ni.

20. A hard disk drive as described in claim 19 wherein said Ni composition is approximately 50%.

\* \* \* \* \*